US012623432B2

(12) United States Patent
Hwang et al.

(10) Patent No.: US 12,623,432 B2
(45) Date of Patent: May 12, 2026

(54) ELECTRONIC DEVICE INCLUDING BATTERY

(71) Applicant: SAMSUNG ELECTRONICS CO., LTD., Suwon-si (KR)

(72) Inventors: Daum Hwang, Suwon-si (KR); Haewoo Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 385 days.

(21) Appl. No.: 18/119,695

(22) Filed: Mar. 9, 2023

(65) Prior Publication Data

US 2023/0226798 A1     Jul. 20, 2023

Related U.S. Application Data

(63) Continuation of application No. PCT/KR2022/021073, filed on Dec. 22, 2022.

(30) Foreign Application Priority Data

| | | |
|---|---|---|
| Jan. 17, 2022 | (KR) | ........................ 10-2022-0006634 |
| Feb. 8, 2022 | (KR) | ........................ 10-2022-0016128 |
| Apr. 15, 2022 | (KR) | ........................ 10-2022-0047034 |

(51) Int. Cl.
  *B32B 3/26*          (2006.01)
  *B32B 7/12*          (2006.01)
  *H04M 1/02*          (2006.01)
(52) U.S. Cl.
  CPC ................ *B32B 3/266* (2013.01); *B32B 7/12* (2013.01); *H04M 1/0262* (2013.01);
           (Continued)

(58) Field of Classification Search
  CPC ....... B32B 3/266; B32B 7/12; B32B 2307/51; B32B 2307/748; B32B 2405/00;
           (Continued)

(56) References Cited

U.S. PATENT DOCUMENTS

| | | |
|---|---|---|
| 6,162,534 A | 12/2000 | Hamerski |
| 7,028,958 B2 | 4/2006 | Pitzen et al. |

(Continued)

FOREIGN PATENT DOCUMENTS

| | | |
|---|---|---|
| CN | 106331232 A | 1/2017 |
| CN | 107483664 A | 12/2017 |

(Continued)

OTHER PUBLICATIONS

Communication dated Apr. 10, 2023, issued by the International Searching Authority in counterpart International Application No. PCT/KR2022/021073 (PCT/ISA/210).
(Continued)

*Primary Examiner* — Christopher W Raimund
(74) *Attorney, Agent, or Firm* — Sughrue Mion, PLLC

(57)          ABSTRACT

An electronic device includes a support member; a battery; and an adhesive tape having a first part provided in an area between the battery and the support member in a lengthwise direction and a second part exposed to an outside of the area between the battery and the support member on at least one of one end or the other end of the battery. The first part of the adhesive tape includes: a first area in a direction from the one end of the battery to the other end of the battery, and a second area in the direction from the one end of the battery to the other end of the battery and the second area being spaced apart from the first area to provide one gap extending through one surface of the first part of the adhesive tape facing the battery.

20 Claims, 16 Drawing Sheets

(52) U.S. Cl.
CPC ....... *H04M 1/0266* (2013.01); *B32B 2307/51* (2013.01); *B32B 2307/748* (2013.01); *B32B 2405/00* (2013.01)

(58) Field of Classification Search
CPC .... H04M 1/0262; H04M 1/0266; H04M 1/02; H04M 1/0254; C09J 7/00; C09J 7/30; C09J 9/00; C09J 2203/326; C09J 2203/33; C09J 2301/204; G06F 1/1635; H01M 50/247; H01M 50/264; Y02E 60/10
See application file for complete search history.

(56) References Cited

U.S. PATENT DOCUMENTS

| | | | |
|---|---|---|---|
| 7,824,753 | B2 | 11/2010 | Bartusiak |
| 9,624,404 | B2 | 4/2017 | Jozuka et al. |
| 11,127,983 | B2 | 9/2021 | Cheong et al. |
| 2016/0002514 | A1 | 1/2016 | Determan et al. |
| 2016/0250805 | A1 * | 9/2016 | Mag ...................... H04M 1/026 455/575.8 |
| 2019/0252653 | A1 | 8/2019 | Han et al. |
| 2019/0267674 | A1 * | 8/2019 | Cheong ............. H01M 10/0587 |
| 2020/0266399 | A1 | 8/2020 | Gao et al. |
| 2023/0392051 | A1 * | 12/2023 | Tan ......................... B32B 5/022 |

FOREIGN PATENT DOCUMENTS

| | | | |
|---|---|---|---|
| CN | 207265138 | U | 4/2018 |
| CN | 108155321 | A | 6/2018 |
| CN | 106098999 | B | 5/2020 |
| CN | 210506192 | U | 5/2020 |
| EP | 3 627 583 | A1 | 3/2020 |
| JP | 2005-327477 | A | 11/2005 |
| JP | 2015211022 | A * | 11/2015 |
| JP | 2016-103738 | A | 6/2016 |
| JP | 2017-75231 | A | 4/2017 |
| JP | 2017075231 | A * | 4/2017 |
| KR | 20-0272270 | Y1 | 4/2002 |
| KR | 10-1593520 | B1 | 2/2016 |
| KR | 10-2019-0102833 | A | 9/2019 |
| KR | 10-2020-0056449 | A | 5/2020 |
| WO | 2015/182050 | A1 | 12/2015 |

OTHER PUBLICATIONS

Communication dated Apr. 10, 2023, issued by the International Searching Authority in counterpart International Application No. PCT/KR2022/021073 (PCT/ISA/237).

Communication issued on Nov. 28, 2024 from the European Patent Office for European Patent Application No. 22920829.3.

* cited by examiner

300

ELECTRONIC DEVICE INCLUDING BATTERY

CROSS-REFERENCE TO RELATED APPLICATIONS

This application is a by-pass continuation application of International Application No. PCT/KR2022/021073, filed on Dec. 22, 2022, which based on and claims priority to Korean Patent Application No. 10-2022-0006634, filed on Jan. 17, 2022, Korean Patent Application No. 10-2022-0016128, filed on Feb. 8, 2022, and, Korean Patent Application No. 10-2022-0047034, filed on Apr. 15, 2022, in the Korean Intellectual Property Office, the disclosures of which are incorporated by reference herein in their entireties.

BACKGROUND

1. Field

The disclosure relates to an electronic device including a battery.

2. Description of Related Art

An electronic device may include a battery for supplying power. The battery may be disposed to be detachable from the electronic device. In order to repair or recycle a battery according to recently-implemented EU eco-design regulations, an electronic device may be required to have a structure enabling a battery to be easily and safely separated.

In order to separate a battery from an electronic device, a method of separating the battery by inputting alcohol to an area to which the battery is attached or a method of detaching the battery by applying power thereto after neglecting the electronic device to which the battery is attached in a low temperature chamber may be used. In the method of separating the battery by inputting alcohol thereto, in case that an input amount of the alcohol is excessive, the alcohol may cause a malfunction of another electronic component or cause damage to the electronic components. In case that too small an amount of alcohol is input, the battery may not be separated from the electronic device. In the method of detaching the battery by neglecting the electronic device in the low temperature chamber, another electronic component may receive a physical impact when the battery is detached.

Accordingly, it may be difficult to separate the battery from the electronic device by a general user, other than a skilled person.

SUMMARY

An electronic device according to various embodiments of the disclosure may include a support member, a battery disposed on the support member, and an adhesive tape having a first part disposed to traverse an area between the battery and the support member and a second part exposed to the outside of the area between the battery and the support member on at least one of one end or the other end of the battery, in a state in which the battery is disposed, wherein the first part of the adhesive tape may include a first area disposed in a direction toward the other end from the one end of the battery and a second area disposed in the direction toward the other end from the one end of the battery and spaced apart from the first area to provide at least one gap extending through at least one surface of the adhesive tape facing the battery, and the second part of the adhesive tape may include an non-adhesive layer on at least one surface thereof.

An adhesive tape according to various embodiments of the disclosure may include a first end part, an adhesive part extending in a first direction from the first end part, and a second end part extending from the adhesive part and facing the first end part, wherein the adhesive part may include a first area disposed in a direction toward the second end part from the first end part and a second area disposed in the direction toward the second end part from the first end part and spaced apart from the first area to provide at least one gap extending through at least one surface of the adhesive part.

Various embodiments disclosed in this document may provide an electronic device capable of preventing its damaging which may occur when a user separates a battery from the electronic device. Also, various embodiments disclosed in this document may provide an electronic device which allows a user to easily separate a battery from the electronic device, while maintaining a fixation power of the battery. In addition, various effects directly or indirectly understood through this document can be provided.

BRIEF DESCRIPTION OF THE DRAWINGS

The above and other aspects, features, and advantages of certain embodiments of the present disclosure will be more apparent from the following description taken in conjunction with the accompanying drawings, in which.

In regard to the description of the drawings, the same or similar reference numerals may be used for the same or similar components.

DETAILED DESCRIPTION

Figure 1:
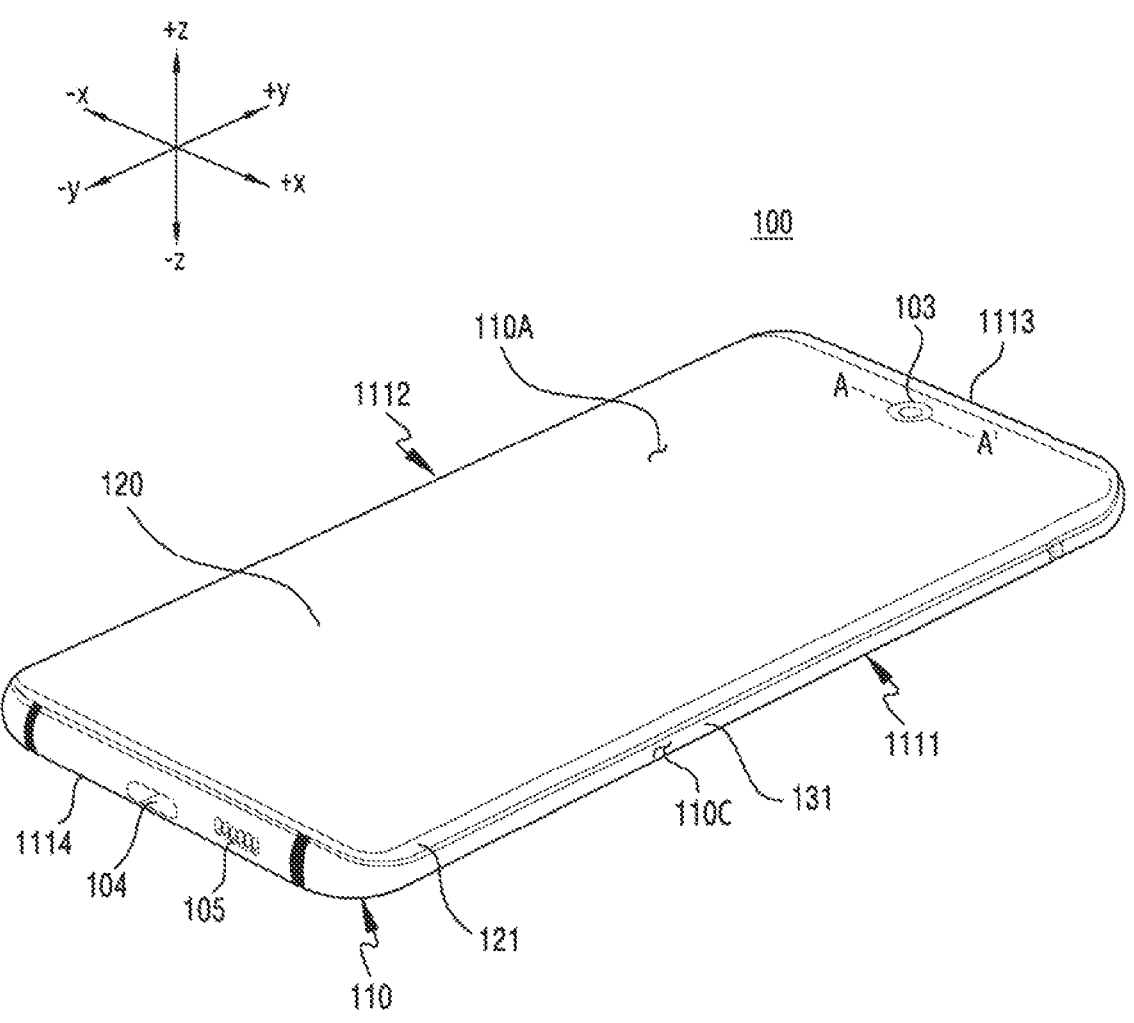
FIG. 1 is a front perspective view of an electronic device according to an embodiment.

Hereinafter, various embodiments of the disclosure will be described in detail with reference to the accompanying drawings. However, it should be appreciated that they are not intended to limit the disclosure to particular embodiments and the disclosure includes various modifications, equivalents, and/or alternatives for various embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit).

In some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box, a game console, an electronic dictionary, an electronic key, a camcorder, and an electronic photo frame.

In an embodiment, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be a combination of one or more of the aforementioned various devices. According to some embodiments, the electronic device may also be a flexible device. Further, the electronic device according to an embodiment of the disclosure is not limited to the aforementioned devices, and may include a new electronic device according to the development of technology.

Figure 2:
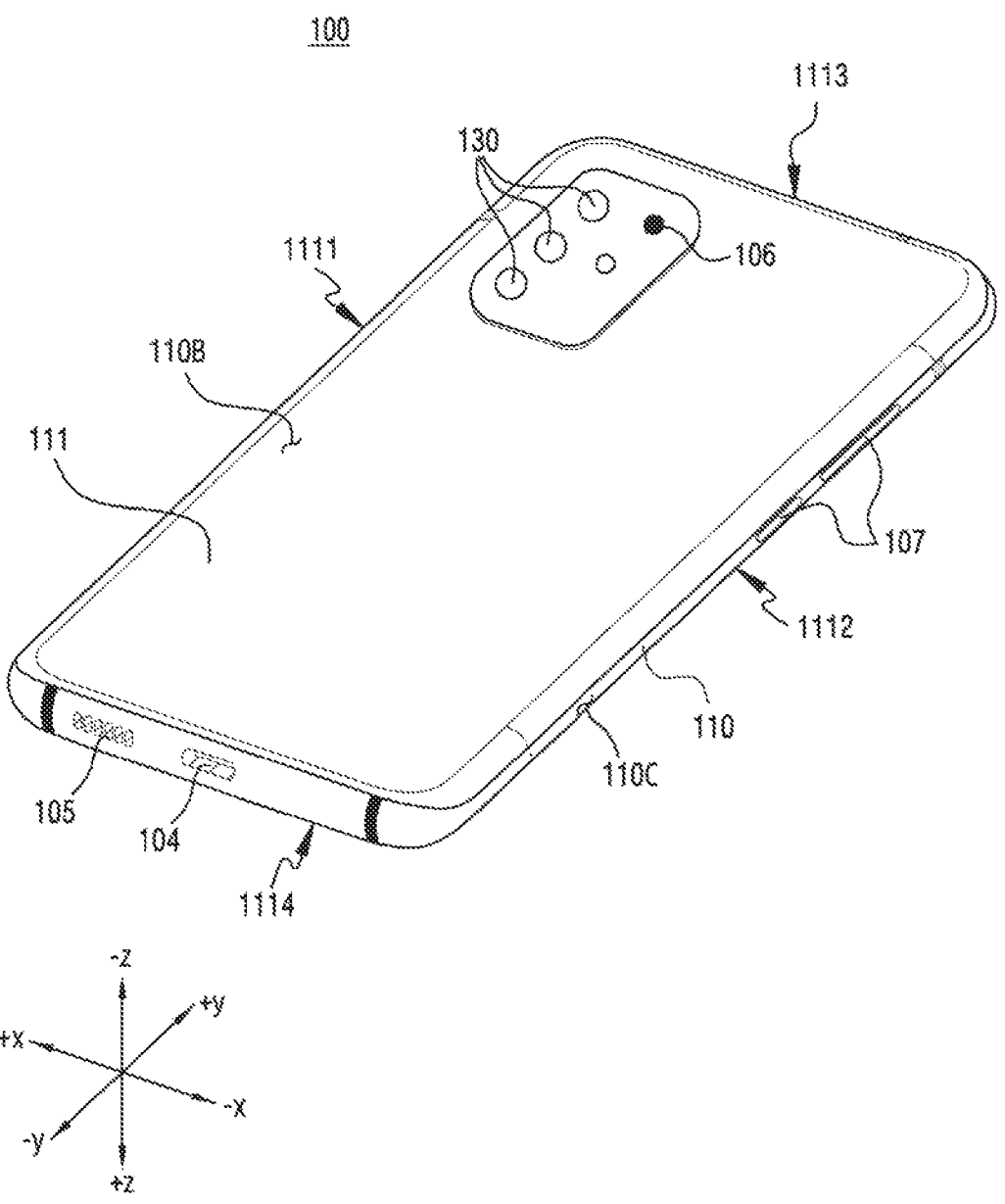
FIG. 2 is a rear perspective view of an electronic device according to an embodiment.

FIG. 1 is a front perspective view of an electronic device 100 according to an embodiment. FIG. 2 is a rear perspective view of the electronic device 100 according to an embodiment.

Referring to FIG. 1 and FIG. 2, the electronic device 100 according to an embodiment may include a first surface 110A (or a front surface), a second surface 110B (or a rear surface), and a housing 110 including a side surface 110C (or a side wall) which surrounds a space between the first surface 110A and the second surface 110B. In an embodiment, the housing 110 may refer to a structure providing a part of the first surface 110A, the second surface 110B, and the side surface 110C.

According to an embodiment, at least a part of the first surface 110A may be configured by a front plate 121 (e.g., a glass plate including various coating layers or a polymer plate) which is substantially transparent. For example, the front plate 121 may include a curved surface part which is bent toward a rear plate 111 from the first surface 110A and seamlessly extends from at least one side end part thereof.

In an embodiment, the second surface 110B may be configured by the rear plate 111 which is substantially opaque. In an embodiment, the rear plate 111 may be made of, for example, coated or colored glass, ceramic, a polymer, a metal (e.g., aluminum, stainless steel (STS) or magnesium), or a combination of at least two of the above materials. For example, the rear plate 111 may include a curved surface part which is bent toward the front plate 121 from the second surface 110B and seamlessly extends from at least one side end part thereof.

In an embodiment, the side surface 110C may be configured by a side surface member (or a side bezel structure or a side wall) including a metal and/or a polymer by combining the front plate 121 and the rear plate 111. In an embodiment, the side surface 110C may include a first side surface 1111 located on a right side (e.g., +x direction of FIG. 1) of the electronic device 100 and extending along a first direction (e.g., +y direction of FIG. 1), a second side surface 1112 which is parallel to the first side surface 1111 and extends along the first direction, a third side surface 1113 extending along the second direction (e.g., +x direction of FIG. 1) perpendicular to the first direction and connecting one end (e.g., one end of +y direction of FIG. 1) of the first side surface 1111 and one end (e.g., one end of +y direction of FIG. 1) of the second side surface 1112, and/or a fourth side surface 1114 which is parallel to the third side surface 1113 and connects the other end (e.g., one end of −y direction of FIG. 1) of the first side surface 1111 and the other end (e.g., one end of −y direction of FIG. 1) of the second side surface 1112.

According to an embodiment, the electronic device 100 may include at least one of a display 120, a first optical sensor 103 (e.g., a sensor module and/or a camera module), a connector hole 104 or an audio module 105. In an embodiment, the electronic device 100 may omit at least one element or additionally include another element. For example, the electronic device 100 may further include a sensor module (not illustrated). The electronic device 100 may omit a key input device 107.

In an embodiment, a sensor, such as a proximity sensor, an illuminance sensor, an image sensor, or an iris sensor, may be integrated into the display 120 in an area provided by the front plate 121 or disposed at a position adjacent to the display 120.

In an embodiment, the display 120 may be visually exposed through a substantial portion of the front plate 121. In an embodiment, the display 120 may be connected to or disposed adjacent to a touch sensing circuit, a pressure sensor capable of measuring the intensity (pressure) of a touch, and/or a digitizer configured to detect a magnetic field type stylus pen. In an embodiment, a corner of the display 120 may be configured to be generally identical to the outside shape (e.g., a curved surface) adjacent to the front plate 121.

In an embodiment, the connector hole 104 may accommodate a connector configured to transmit and receive power and/or data to and from an external electronic device (e.g., an electronic device) and/or a connector configured to transmit and receive an audio signal to and from an external electronic device. For example, the connector hole 104 may include a USB connector or an earphone jack (not illustrated) (or an earphone interface). In an embodiment, the USB connector and the earphone jack may be implemented as a single hole. In an embodiment, the electronic device 100 may be configured to transmit and receive power and/or data to and from, or transmit and receive the audio signal to and from an external electronic device without a separate connector hole.

In an embodiment, the audio module 105 may include a microphone hole and a speaker hole. The microphone hole may have a microphone disposed inside thereof for obtaining external sound and may have a plurality of microphones arranged to sense the direction of sound. In an embodiment, the speaker hole and the microphone hole may be implemented as a single hole, or a speaker (e.g., a piezo speaker) may be included without the speaker hole. The speaker hole may include an external speaker hole and a call receiver hole.

In an embodiment, the key input devices 107 may be disposed on the side surface 110C of the housing 110. In an embodiment, the electronic device 100 may not include some or all of the key input devices 107 described above, and the key input devices 107 which are not included therein may be implemented in a different form, such as a soft key, on the display 120. In an embodiment, the key input devices 107 may include at least a part of a fingerprint sensor disposed on the second surface 110B of the housing 110.

In an embodiment, a second optical sensor 130 and a third optical sensor 106 may be disposed on the second surface 110B of the electronic device 100. The second optical sensor 130 may include a plurality of cameras. In an embodiment, the third optical sensor 106 may include a flash. In an embodiment, the first optical sensor 103, the second optical sensor 130, and the third optical sensor 106 may include one or more lenses, an image sensor, and/or an image processor. The third optical sensor 106 may include a light-emitting diode or a xenon lamp. In an embodiment, two or more lenses (e.g., an infrared camera, and a wide-angle and telephoto lens) and image sensors may be disposed on one surface of the electronic device 100.

In an embodiment, the electronic device 100 may include the sensor module (not illustrated) to generate an electrical signal or a data value corresponding to an internal operation state or an external environment state. The electronic device 100 may include the sensor module (not illustrated), for example, at least one of a gesture sensor, a gyro sensor, a barometric pressure sensor, a magnetic sensor, an acceleration sensor, a grip sensor, a color sensor, an infrared (IR) sensor, a temperature sensor, or a humidity sensor.

Figure 3:
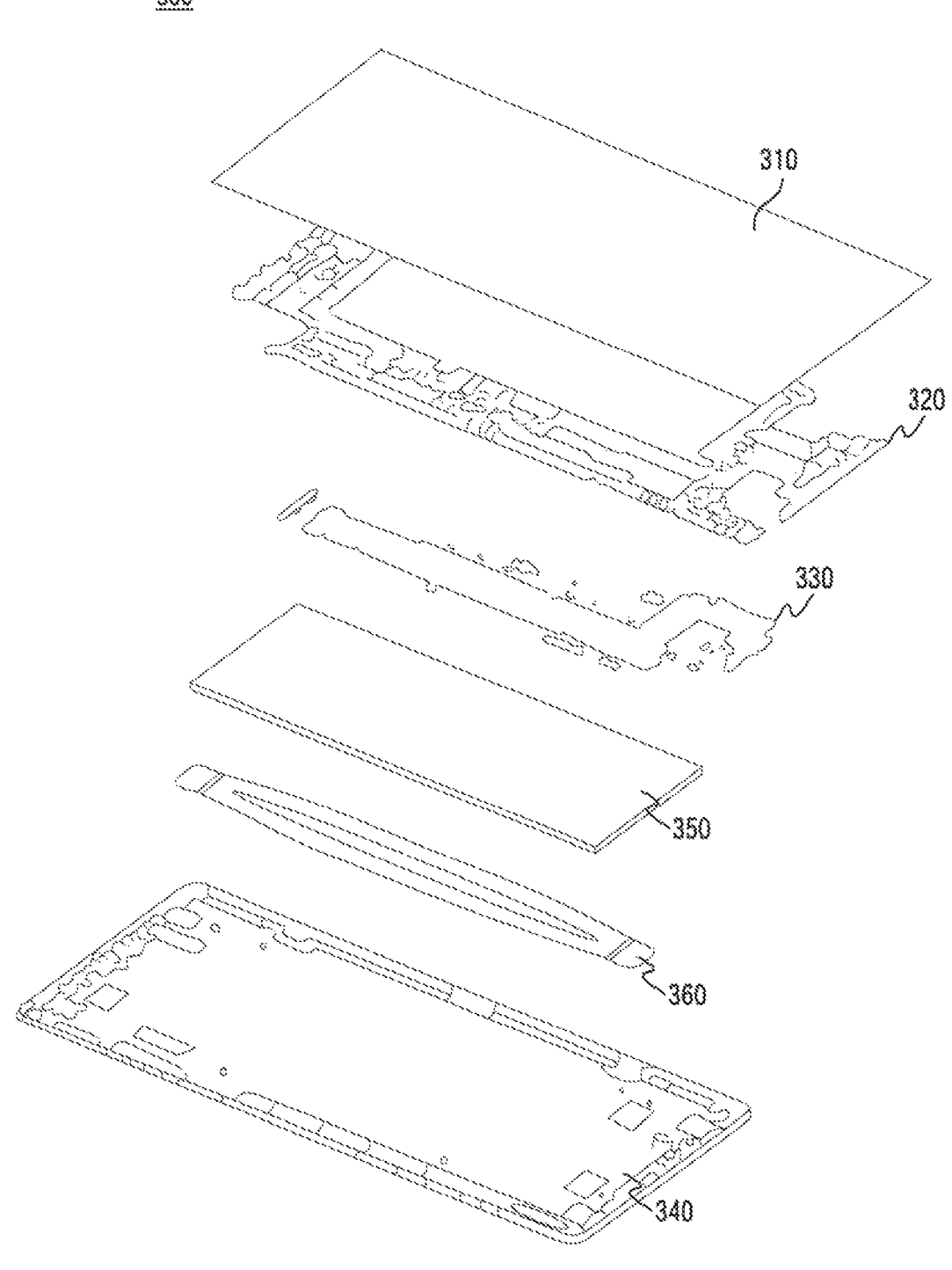
FIG. 3 is an exploded perspective view of an electronic device according to an embodiment.

FIG. 3 is an exploded perspective view of an electronic device 300 according to an embodiment.

Referring to FIG. 3, the electronic device 300 may include a display 310, a first support member 320 (e.g., a bracket), a printed circuit board 330, a battery 350, an adhesive tape

360, and a second support member 340 (e.g., a rear case). In some embodiments, the electronic device 300 may omit at least one of the elements as described above or may additionally include another element. At least one of the elements of the electronic device 300 may be the same as or similar to at least one of the elements of the electronic device 100 of FIG. 1 or FIG. 2, and redundant descriptions are omitted below.

The first support member 320 may be disposed inside the electronic device 300 to be connected to the side bezel structure or to be integrally configured with the side bezel structure. The first support member 320 may be made of, for example, a metal material and/or a non-metal material (e.g., a polymer). The first support member 320 may have the display 310 connected to one surface thereof and the printed circuit board 330 connected to the other surface thereof. The printed circuit board 330 may be equipped with a processor, a memory, and/or an interface. The processor may include, for example, one or more of a central processing unit, an application processor, a graphics processing unit, an image signal processor, a sensor hub processor, or a communication processor.

The memory may include, for example, a volatile memory or a nonvolatile memory.

The interface may include, for example, an HDMI (high definition multimedia interface) interface, a USB (universal serial bus) interface, a SD card interface, and/or an audio interface. The interface may electrically or physically connect, for example, the electronic device 300 with an external electronic device, and may include a USB connector, a SD card/MMC connector, or an audio connector.

The battery 350, which is a device for supplying power to at least one element of the electronic device 300, may include, for example, a non-rechargeable primary battery or a rechargeable secondary battery, or a fuel cell. At least a part of the battery 350 may be disposed, for example, on a substantially the same plane as the printed circuit board 330. The battery 350 may be disposed to be detachable from the electronic device 300. For example, the battery 350 may be disposed to be detachable from the second support member 340 by using the adhesive tape 360. At least a part of the adhesive tape 360 may be disposed between the battery 350 and the second support member 340.

Figure 4:
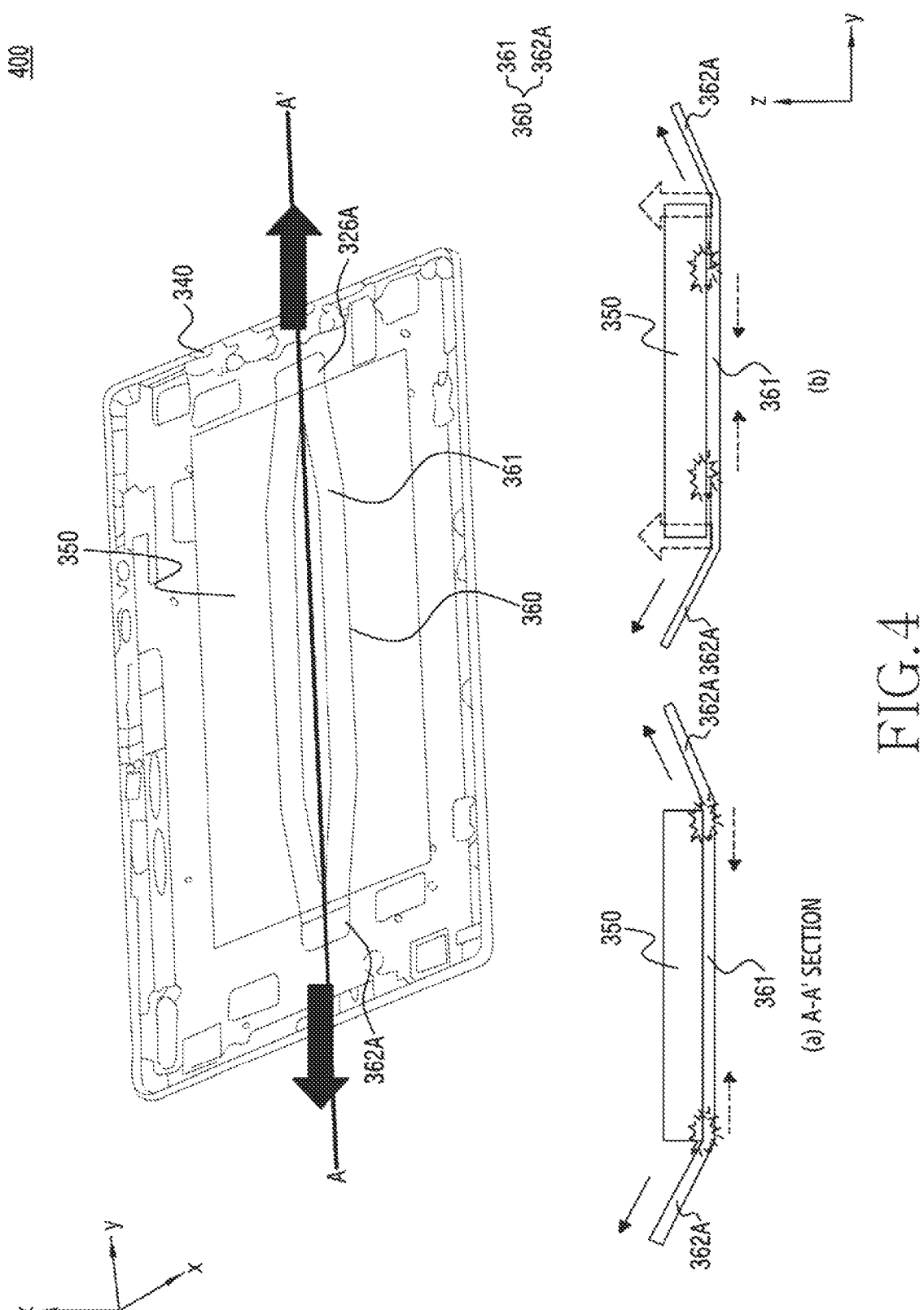
FIG. 4 is a perspective view and a cross-sectional view illustrating a battery disposed in an electronic device according to an embodiment.

FIG. 4 is a perspective view and a cross-sectional view illustrating the battery 350 disposed in an electronic device 400 according to an embodiment.

The electronic device 400 and at least one of the elements of FIG. 4 may be referred by the electronic device 200 of FIG. 1 to FIG. 2 or the electronic device 300 of FIG. 3 and at least one of the elements thereof. The same terms or the same reference numerals are used for the same or substantially the same components as those described above, and redundant descriptions are omitted.

Referring to FIG. 4, the battery 350 may be disposed inside the electronic device 400. For example, the battery 350 may be disposed on one surface of the second support member 340. According to an embodiment, the battery 350 may be disposed in the lengthwise direction which is the lengthwise direction of the electronic device 400 (e.g., y-axis direction). However, it is not limited thereto. According to an embodiment, the adhesive tape 360 may be disposed in the lengthwise direction which is the lengthwise direction of the battery 350 (e.g., y-axis direction). For example, the adhesive tape 360 may be disposed in the lengthwise direction which is a direction substantially perpendicular to the lengthwise direction of the battery 350 (e.g., x-axis direction).

According to an embodiment, the adhesive tape 360 may be disposed between the battery 350 and the second support member 340. For example, at least one surface of the adhesive tape 360 may face the battery 350 and the second support member 340. According to an embodiment, an adhesive part 361 of the adhesive tape 360 may be disposed to traverse an area between the battery 350 and the second support member 340. For example, the adhesive part 361 of the adhesive tape 360 may be disposed in the lengthwise direction which is a direction toward the other end of the battery 350 from the one end of the battery 350 (e.g., y-axis direction).

According to an embodiment, remaining parts 362A of the adhesive tape 360 may be exposed to the outside of an area between the battery 350 and the second support member 340. For example, the remaining parts 362A of the adhesive tape 360 may be exposed to the outside of the area between the battery 350 and the second support member 340 on at least one among the one end or the other end of the battery 350.

According to an embodiment, the adhesive tape 360 may include at least one of a stretchable material or an elastic material. For example, the adhesive tape 360 may include a material, the length of which is increased as a user pulls the adhesive tape 360 in one direction. However, it is not limited thereto. The adhesive tape 360 may include a material which may be stretched to be detached. According to an embodiment, the adhesive tape 360 may include at least one adhesive layer. For example, at least one adhesive layer may include an adhesive material or a synthetic resin.

According to an embodiment, the battery 350 may be disposed to be detachable from the electronic device 400. For example, the battery 350 may be attached to the electronic device 400 (e.g., the second support member 340) by using the adhesive tape 360. According to an embodiment, the battery 350 may be separated from the electronic device 400 by a user of the electronic device 400. Referring to FIG. 4, the battery 350 may be separated from the electronic device 400 as a user pulls the remaining parts 362A of the adhesive tape 360. For example, the battery 350 may be separated from the second support member 340 as a user pulls the remaining parts 362A of the adhesive tape 360 in the lengthwise direction of the adhesive tape 360 (e.g., pulling same in −y-axis direction at the one end of the battery 350 and pulling the same in +y-axis direction at the other end of the battery 350).

Referring to (a) of FIG. 4, the adhesive part 361 of the adhesive tape 360 may face the battery 350, and the remaining parts 362A thereof may be exposed to the outside area of the battery 350. Referring to (b) of FIG. 4, at least a part of the adhesive part 361 of the adhesive tape 360 may be stretched by pulling the remaining parts 362A of the battery 350. For example, at least a part among the adhesive part 361 of the adhesive tape 360 disposed at an area close to the one end or the other end of the battery 350 may be stretched.

According to an embodiment, at least a part of the adhesive part 361 of the adhesive tape 360 may be stretched, so that an adhesive power of the adhesive tape 360 may be weakened. For example, as the adhesive part 361 of the adhesive tape 360 is stretched, a size of an area (e.g., an adhesive surface) facing the battery 350 or the second support member 340 may be reduced. Since the size of the adhesive surface of the adhesive tape 360 is reduced, the adhesive tape 360 has at least one gap provided on an area between the battery 350 and the second support member 340, or a part thereof may be detached from at least one of the battery 350 or the second support member 340.

According to an embodiment, the adhesive power of the adhesive tape 360 is weakened, so that the battery 350 may be separated from the electronic device 400 (e.g., the second support member 340). For example, a user pulls the remaining parts 362A of the adhesive tape 360 in the lengthwise direction of the adhesive tape 360 (e.g., x-axis direction), so that the user may lift the remaining parts 362A of the adhesive tape 360 in a direction in which the battery 350 is separated (e.g., +z-axis direction) in a state where the adhesive power of the adhesive tape 360 is weakened. The remaining parts 362A of the adhesive tape 360 is lifted, so that the battery 350 may be separated from the electronic device 400 (e.g., the second support member 340) along with the adhesive tape 360.

According to an embodiment, the adhesive tape 360 may be disposed such that the lengthwise direction thereof extends toward the other end from the one end of the battery 350. For example, the adhesive tape 360 may be disposed in the lengthwise direction of the battery 350. Therefore, the size of the adhesive surface of the adhesive tape 360 increases, so that a fixation power of the adhesive tape 360 may be improved.

According to an embodiment, the adhesive tape 360 may be stretched in the lengthwise direction of the adhesive tape 360 from the one end and the other end of the battery 350. As the adhesive tape 360 is stretched in opposite directions (e.g., +x-axis direction and −x-axis direction), a user may stretch the adhesive tape 360 by little force and a degree of stretch of the adhesive tape 360 may be increased. Therefore, the user may easily separate the battery 350 from the electronic device 400. In addition, in case that one end of the adhesive tape 360 is broken (or ruptured), the user stretches the adhesive tape 360 toward the other one end to separate the battery 350 from the electronic device 400.

Figure 5:
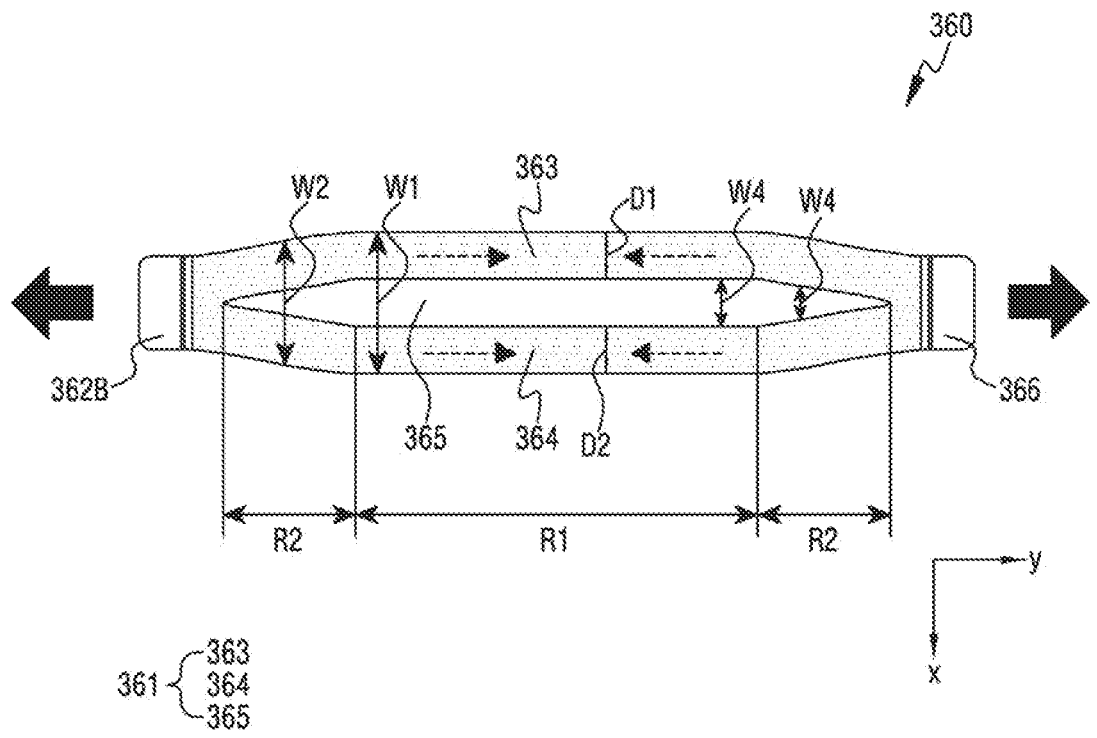
FIG. 5 is a plan view illustrating an adhesive tape according to an embodiment.

FIG. 5 is a plan view illustrating the adhesive tape 360 according to an embodiment.

The adhesive tape 360 of FIG. 5 may be referred by the adhesive tape 360 of FIG. 3 and FIG. 4. The same terms or the same reference numerals are used for the same or substantially the same components as those described above, and redundant descriptions are omitted.

Referring to FIG. 5, the adhesive tape 360 according to an embodiment may include a first end part 362B, an adhesive part 361 extending in a first direction from the first end part 362B, and a second end part 366 extending from the adhesive part 361. The first end part 362B may face the second end part 366. According to an embodiment, the adhesive tape 360 may be one member. For example, the first end part 362B, the adhesive part 361, and the second end part 366 may be configured as one member. However, it is not limited thereto. For example, at least one among the first end part 362B, the second end part 366, and the adhesive part 361 may be configured as different members.

According to an embodiment, at least a part of at least one among the first end part 362B or the second end part 366 of the adhesive tape 360 may be exposed to an area between the battery and the second support member (340 of FIG. 4) in a state in which the adhesive tape 360 is disposed in the battery (350 of FIG. 4). At least a part of the adhesive part 361 of the adhesive tape 360 may be disposed on area between the battery and the second support member. For example, the adhesive part 361 of the adhesive tape 360 may be included in a part (361 of FIG. 4) of the adhesive tape 360 and the first end part 362B and the second end part 366 may be included in the remaining part (362 of FIG. 4).

According to an embodiment, the adhesive part 361 may include a first area 363 disposed in a direction toward the second end part 366 from the first end part 362B and a second area 364 disposed in the direction toward the second end part 366 from the first end part 362B. The first area 363 and the second area 364 may be spaced a predetermined interval apart from each other. The second area 364 is spaced apart from the first area 363 to provide at least one gap 365. The at least one gap 365 may extend through at least one surface of the adhesive part 361. For example, the at least one gap 365 may extend through at least one surface of the adhesive tape 360 facing the battery (350 of FIG. 4).

According to an embodiment, the first area 363 may have a first width D1 in a direction toward the second area 364 from the first area 363 (e.g., x-axis direction). The second area 364 may have a second width D2 in the direction toward the second area 364 from the first area 363. According to an embodiment, the first width D1 may be the same as the second width D2. However, it is not limited thereto.

According to an embodiment, at least one width among the first width D1 or the second width D2 may be 20 mm or less. At least one width among the first width D1 or the second width D2 maintains 20 mm or less, so that the stretchable performance of the adhesive tape 360 may be improved. For example, the stretchable performance of the adhesive part 361 of the adhesive tape 360 may be improved. However, it is not limited thereto.

According to an embodiment, the adhesive part 361 may include a first section R1 and a second section R2 which is closer to the first end part 362B or the second end part 366 than the first section R1. In FIG. 5, the first section R1 and the second section R2 are merely an example to describe the disclosure, and are not limited by FIG. 5. For example, the length of the first section R1 or the second section R2 of FIG. 5 is not limited to FIG. 5.

According to an embodiment, the width of the adhesive part 361 in the direction toward the second area 364 from the first area 363 may not be consistent. For example, the width of at least a part of the adhesive part 361 may be reduced toward the first end part 362B or the second end part 366. According to an embodiment, the width of the adhesive part 361 in the first section R1 may be larger than that in the second section R2. Referring to FIG. 5 for a detailed description, the adhesive part 361 may have a first width W1 in the first section R1 and a second width W2 in the second section R2. The first width W1 may be larger than the second width W2. However, it is not limited thereto. In an embodiment, the first width W1 may be the same as the second width W2.

According to an embodiment, since the second width W2 is smaller than the first width W1, weight applied to the stretch area of the adhesive tape 360 may be dispersed in case that the adhesive tape 360 is stretched. Accordingly, a user may easily separate the battery (350 of FIG. 4) from the electronic device (400 of FIG. 4) by little force. In addition, weight applied to the stretch area is dispersed, so that the adhesive tape 360 may be prevented from being ruptured.

According to an embodiment, the width of at least one gap 365 in the direction toward the second area 364 from the first area 363 may not be consistent. For example, the width of at least a part of the at least one gap 365 may be reduced toward the first end part 362B or the second end part 366. According to an embodiment, the width of the at least one gap 365 in the first section R1 may be larger than that in the second section R2. Referring to FIG. 5 for a detailed description, the at least one gap 365 may have a first width W3 in the first section R1 and a second width W4 in the second section R2. The first width W3 may be larger than the second width W4. However, it is not limited thereto. In an embodiment, the first width W3 may be the same as the second width W4.

According to an embodiment, the width of the at least one gap 365 may be controlled. For example, as the width of the at least one gap 365 increases (or, a distance between the first area 363 and the second area 364 increases), a fixation power of the adhesive tape 360 may be improved. For example, as the width of the at least one gap 365 reduces (or, a distance between the first area 363 and the second area 364 reduces), stretchable ease of the adhesive tape 360 may be improved.

Figure 6A:
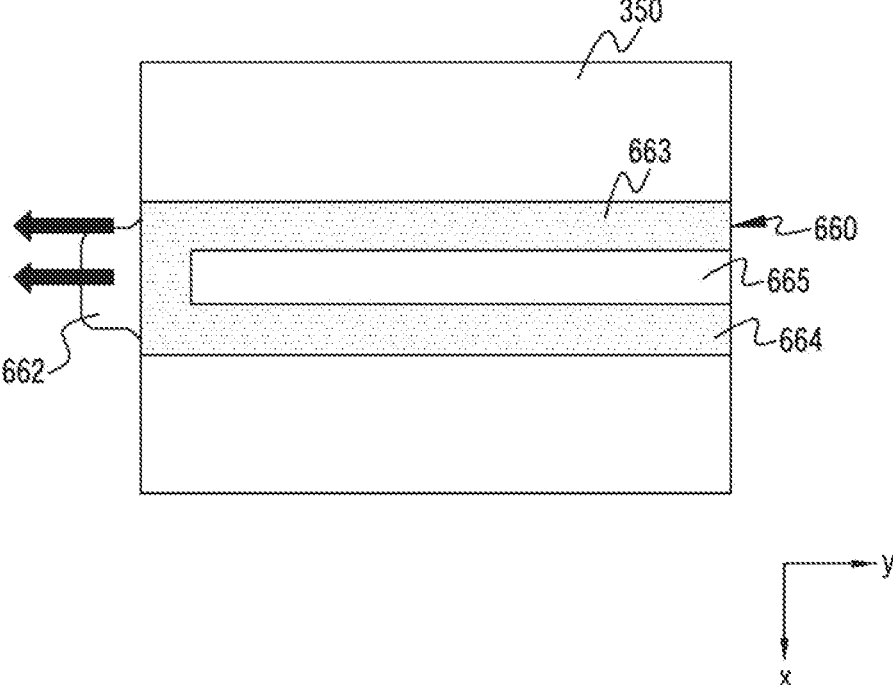
FIG. 6A is a plan view illustrating an adhesive tape according to an embodiment.
Figure 6B:
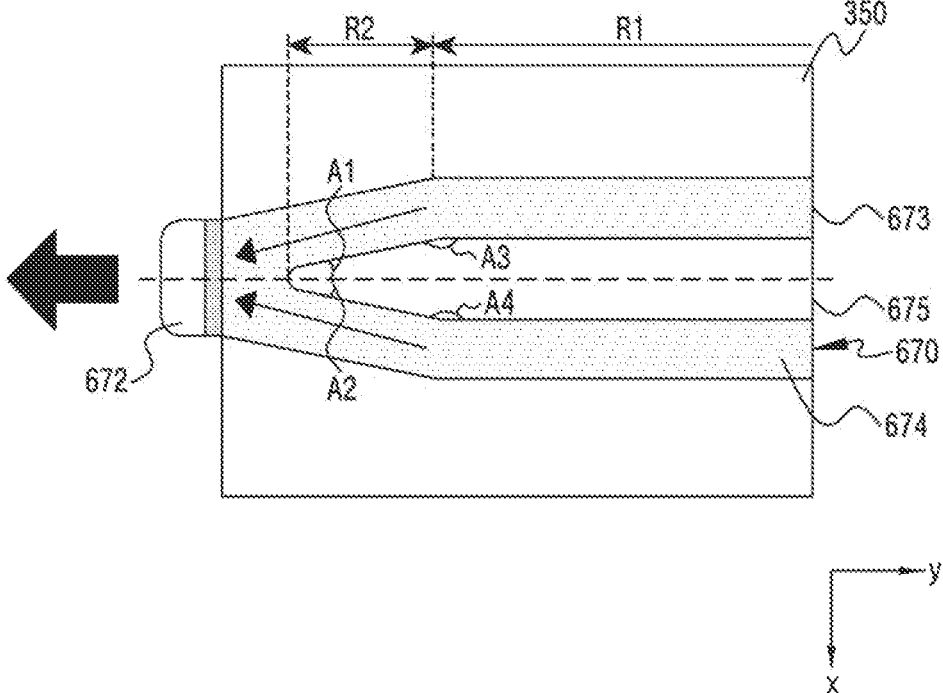
FIG. 6B is a plan view illustrating an adhesive tape according to an embodiment.

FIG. 6A and FIG. 6B is a plan view illustrating adhesive tapes 660 and 670 according to various embodiments.

The adhesive tapes 660 and 670 of FIG. 6A and FIG. 6B may be referred by the adhesive tape 360 of FIG. 3 to FIG. 5. The elements of the electronic device of FIG. 6A and FIG. 6B may be referred by the electronic device 100 of FIG. 1 and FIG. 2, the electronic device 300 of FIG. 3 or the electronic device 400 and the elements of FIG. 4. The same terms or the same reference numerals are used for the same or substantially the same components as those described above, and redundant descriptions are omitted.

Referring to FIG. 6A, the adhesive tape 660 according to an embodiment may include a square shape. For example, an area (for example, the adhesive part 361 of the adhesive tape 360 of FIG. 4) facing the battery 350 of the adhesive tape 660 may have a square shape. According to an embodiment, at least a part of a first area 633 and a second area 664 may be parallel to each other. For example, at least a part of the first area 633 and the second area 664 may be parallel to the lengthwise direction of the adhesive tape 660 (e.g., y-axis direction). However, it is not limited thereto. For example, the first area 633 and the second area 664 may be parallel to each other in all sections. For example, the adhesive tape 660 may include a square or a rectangle shape.

According to an embodiment, at least one gap 665 of the adhesive tape 660 may include a square shape. For example, the width of the at least one gap 665 may be consistent. However, it is not limited thereto.

Referring to FIG. 6B, the adhesive tape 670 according to an embodiment may include a polygon shape. For example, the adhesive tape 670 may include a hexagon or a diamond shape. However, it is not limited thereto. For example, the adhesive tape 670 may be an oval shape or a shape including the outside, at least a part of which is convex or concave.

According to an embodiment, at least one gap 675 of the adhesive tape 670 may include a polygon shape. For example, the at least one gap 675 may include a hexagon or a diamond shape. However, it is not limited thereto. For example, the at least one gap 675 may be an oval shape or a shape including the outside, at least a part of which is convex or concave.

According to an embodiment, the width of the adhesive tape 670 in the first section R1 may be larger than that in the second section R2. According to an embodiment, a distance between the first area 673 and the second area 674 in the second section R2 may be gradually reduced. For example, in the second section R2, the first area 673 may have a first internal angle A1 with respect to the lengthwise direction (or a direction in which the adhesive tape 670 is pulled) of the adhesive tape 670 and the second area 674 may have a second internal angle A2 with respect to the lengthwise direction. The first internal angle A1 and the second internal angle A2 may be an acute angle. However, it is not limited thereto. According to an embodiment, the first internal angle A1 may be the same as the second internal angle A2. However, it is not limited thereto.

According to an embodiment, the first area 673 of the first section R1 may be disposed to have a third internal angle A3 with respect to the first area 673 of the second section R2. The second area 674 of the first section R1 may be disposed to have a fourth internal angle A4 with respect to the second area 674 of the second section R2. According to an embodiment, referring to FIG. 6B, the third internal angle A3 and the fourth internal angle A4 may be an obtuse angle. However, it is not limited thereto. According to an embodiment, the third internal angle A3 may be the same as the fourth internal angle A4. However, it is not limited thereto.

FIG. 7A to 7D is a plan view illustrating adhesive tapes 760, 770, 780, or 790 according to various embodiments.

At least one adhesive tape of FIG. 7A to 7D may be referred by the adhesive tape 360 of FIG. 3 to FIG. 5 or at least one adhesive tape 660 or 670 of FIG. 6A and FIG. 6B. The same terms or the same reference numerals are used for the same or substantially the same components as those described above, and redundant descriptions are omitted.

The adhesive tapes of FIG. 7A to 7D merely illustrate a part shape of the adhesive tapes, but the adhesive tape of the disclosure is not limited thereto. For example, the adhesive tape 760 of FIG. 7A merely illustrates a first end part 762 and only a part of an adhesive part extending from the first end part 762, but a second end part (not illustrated) of the adhesive tape 760 and the adhesive part extending from the second end part may be explained by referring thereto.

Figure 7A:
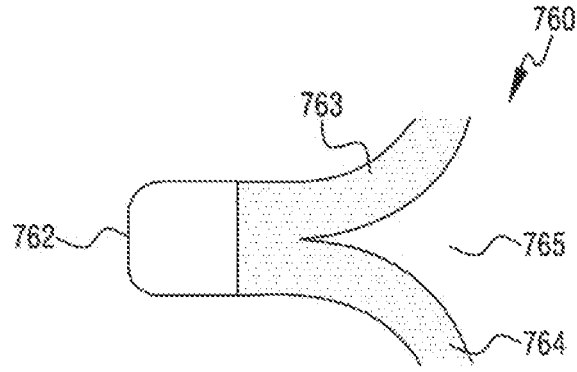
FIG. 7A is a plan view illustrating an adhesive tape according to one embodiment.
Figure 7A:
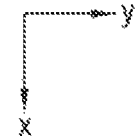

According to an embodiment, at least a part of the outside of the adhesive tape may include a curved shape. Referring to FIG. 7A, at least a part of the adhesive tape 760 according to an embodiment may include a concave shape. For example, at least a part of at least one of a first area 763 or a second area 764 may include a shape which is concave toward the inside of the adhesive tape 760. At least a part of the outside of the adhesive tape 760 may include a curved surface part which is concavely bent toward the first end part 762 or the second end part (not illustrated) and seamlessly extends toward the first end part 762 or the second end part of the adhesive tape 760.

According to an embodiment, at least a part of at least one gap of the adhesive tape may include a curved shape. For example, at least a part of at least one gap 765 may include a concave shape. For example, at least a part of the at least one gap 765 may include a shape which is concave toward the inside of the at least one gap 765. However, it is not limited thereto. For example, one end of the at least one gap 765 may include a cuneate shape configured by the first area 763 and the second area 764.

Figure 7B:
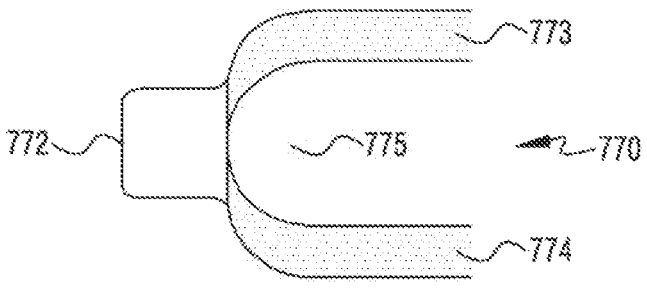
FIG. 7B is a plan view illustrating an adhesive tape according to one embodiment.
Figure 7B:

Referring to FIG. 7B, at least a part of the adhesive tape 770 according to an embodiment may include a convex shape. For example, at least a part of at least one of a first area 773 or a second area 774 may include a shape which is convex in a direction toward the outside of the adhesive tape 770. At least a part of the outside of the adhesive tape 770 may include a curved surface part which is convexly bent toward a first end part 772 or the second end part (not illustrated) and seamlessly extends toward the first end part 772 or the second end part of the adhesive tape 770. For example, the adhesive part of the adhesive tape 770 may include an oval shape.

According to an embodiment, at least a part of at least one gap 775 may include a convex shape. For example, at least a part of the at least one gap 775 may include a shape which is convex in a direction toward the outside of the at least one gap 775. However, it is not limited thereto. For example, the at least one gap 775 may include an oval shape. Referring to FIG. 7B, the at least one gap 775 according to an embodiment may be in contact with the first end part 772.

Figure 7C:
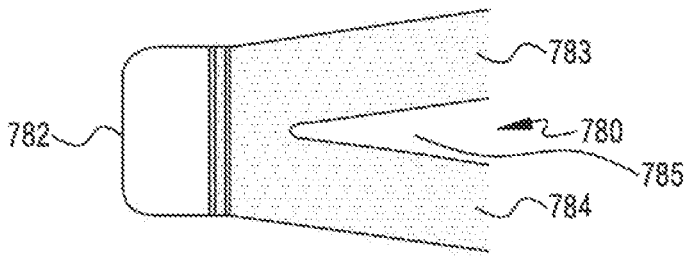
FIG. 7C is a plan view illustrating an adhesive tape according to one embodiment.
Figure 7C:
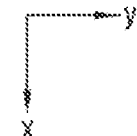

Referring to FIG. 7C, the adhesive tape 780 according to an embodiment may include a first area 783 and a second area 784 having a predetermined angle with respect to the lengthwise direction of the adhesive tape 780 (e.g., y-axis direction). The adhesive tape 780 of FIG. 7C may be referred by the adhesive tape 360 of FIG. 5 and the adhesive tape 670 of FIG. 6B.

Figure 7D:
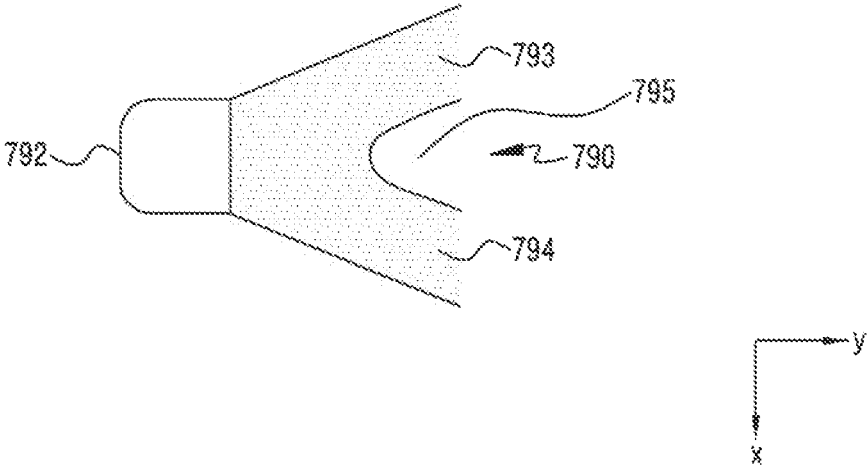
FIG. 7D is a plan view illustrating an adhesive tape according to one embodiment.

Referring to FIG. 7D, at least one gap 795 of the adhesive tape 790 according to an embodiment may include a blunt shape. For example, one end of the gap 795 configured by a first area 793 and a second area 794 may include a blunt shape. However, it is not limited thereto. For example, at least one end of the at least one gap 795 may include various shapes such as a sagittate or a hastate shape.

Figure 8A:
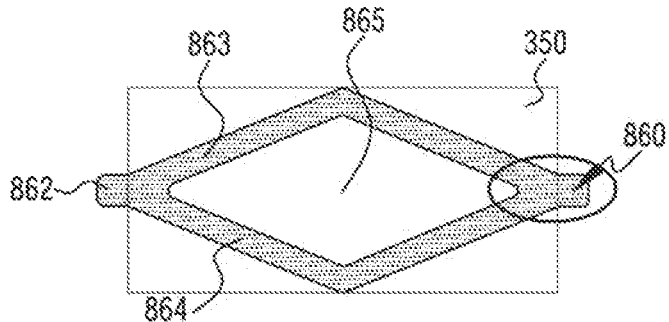
FIG. 8A is a plan view illustrating an adhesive tape including a gap according to one embodiment.
Figure 8B:
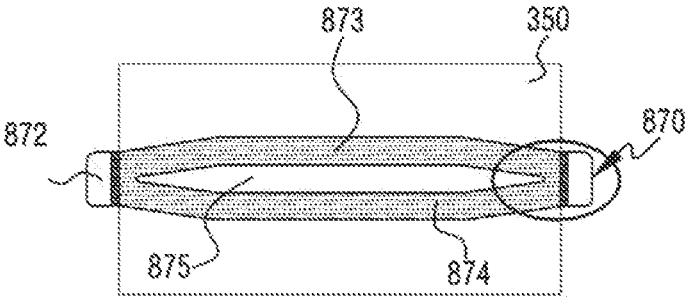
FIG. 8B is a plan view illustrating an adhesive tape including a gap according to one embodiment.
Figure 8B:
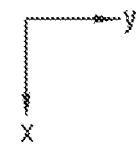

FIG. 8A and FIG. 8B is a plan view illustrating an adhesive tape including a gap according to various embodiments.

An adhesive tape 860 of FIG. 8A and an adhesive tape 870 of FIG. 8B may be referred by the adhesive tape 360 of FIG. 3 to FIG. 5 and the adhesive tape 670 of FIG. 6B. The same terms or the same reference numerals are used for the same or substantially the same components as those described above, and redundant descriptions are omitted.

According to an embodiment, a fixation power of the adhesive tape 860 may be controlled according to a shape of the adhesive tape 860. According to an embodiment, the adhesive tape 860 may include a polygon shape. For example, referring to FIG. 8A, the adhesive tape 860 may include a diamond shape. However, it is not limited thereto. In an embodiment, referring to FIG. 8B, the adhesive tape 870 may include a hexagon shape.

According to an embodiment, at least one gap 865 of the adhesive tape 860 may include a shape corresponding to a shape of the adhesive tape. For example, referring to FIG. 8A, the at least one gap 865 of the adhesive tape 860 may include a diamond shape. However, it is not limited thereto. For example, referring to FIG. 8B, at least one gap 875 of the adhesive tape 870 may include a hexagon shape.

According to an embodiment, a shape of the adhesive tape 860 includes a diamond or a hexagon shape, so that a fixation power and/or a resistance of an external weight of the adhesive tape 860 may be improved (refer to a technical document "Prediction to Shock Absorption Energy of an Aluminum Honeycomb—Hyun-Duk Kim, Hyuk-Hee Lee, Do-Soon Hwang, and Jungsun Park").

Figure 9:
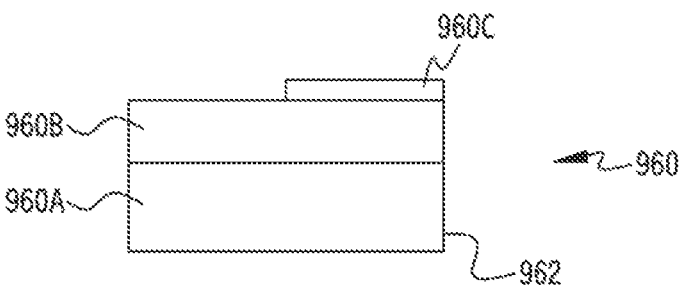
FIG. 9 is a cross-sectional view of an adhesive tape according to an embodiment.

FIG. 9 is a cross-sectional view of an adhesive tape 960 according to an embodiment.

The adhesive tape 960 of FIG. 9 may be referred by at least one of the adhesive tapes of FIG. 3 to FIG. 8B. The same terms or the same reference numerals are used for the same or substantially the same components as those described above, and redundant descriptions are omitted.

Referring to FIG. 9, the adhesive tape 960 according to an embodiment may include a first adhesive layer 960A and a second adhesive layer 960B disposed on the first adhesive layer 960A. According to an embodiment, at least a part of at least one surface of the adhesive tape 960 may include a non-adhesive layer 960C. For example, a remaining part 962 of the adhesive tape 960 may include the non-adhesive layer 960C on at least one surface thereof. In an embodiment, the first end part or the second end part (the first end part 362B or the second end part 366 of FIG. 5) of the adhesive tape 960 may include the non-adhesive layer 960C on at least a part of at least one surface thereof. According to an embodiment, the non-adhesive layer 960C may play a role of a handle when a user stretches the adhesive tape 960.

FIG. 9 illustrates the non-adhesive layer 960C disposed (or applied) on at least a part of an upper surface of the second adhesive layer 960B, but it is not limited thereto. For example, the non-adhesive layer 960C is disposed on at least a part of a rear surface of the first adhesive layer 960A, or disposed on both the rear surface of the first adhesive layer 960A and the upper surface of the second adhesive layer 960B.

According to an embodiment, the non-adhesive layer 960C may include a material which has the thin thickness and/or no adhesive power. For example, the non-adhesive layer 960C may include at least one of a printing layer or a tape. However, it is not limited thereto. For example, the non-adhesive layer 960C may include a material which has the same or similar stretch rate as or to the starch rate of the adhesive tape 960.

According to an embodiment, the non-adhesive layer 960C may include a printing layer, so that a manufacturing process of the adhesive layer 960 is simplified and the material cost thereof may be reduced.

According to an embodiment, the thickness of the non-adhesive layer 960C is thin, so that the adhesive tape 960 may be prevented from generating rupture by difference of a stretch rate of the adhesive tape 960. In addition, the non-adhesive layer 960C may prevent a mounting space of the electronic device from being reduced.

According to an embodiment, the thickness of the non-adhesive layer 960C may be 3 um or less. However, it is not limited thereto.

Figure 10A:
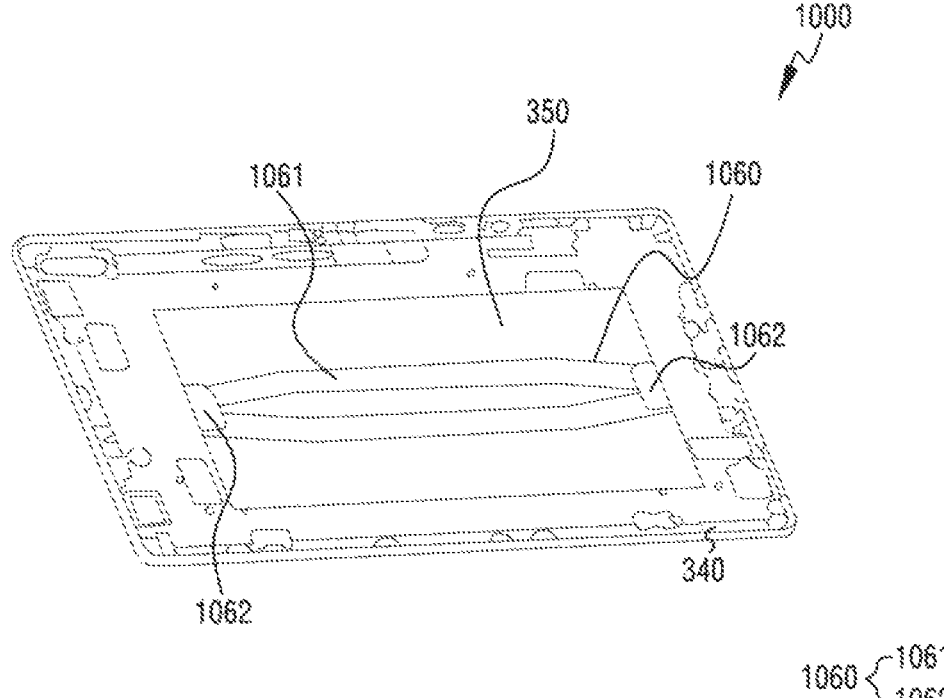
FIG. 10A is a perspective view illustrating a battery disposed in an electronic device according to an embodiment.
Figure 10B:
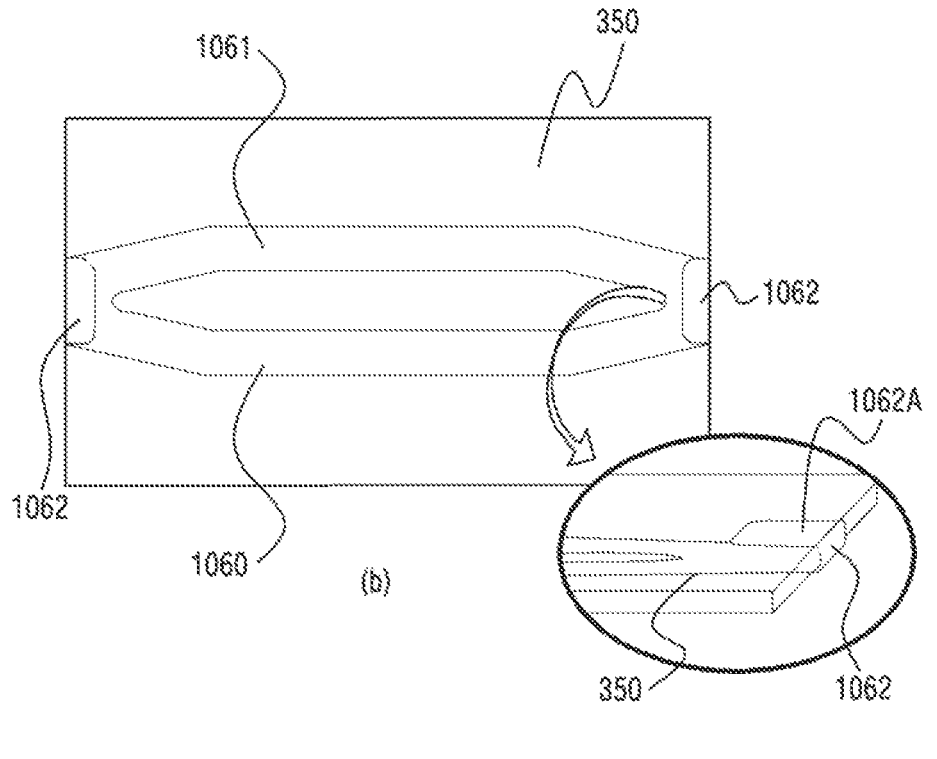
FIG. 10B is a plan view illustrating a battery disposed in an electronic device according to an embodiment.

FIG. 10A and FIG. 10B are a perspective view and a plan view illustrating the battery 350 disposed on an electronic device 1000 according to an embodiment.

FIG. 10A is a perspective view illustrating the second support member 340 to which the battery 350 is attached by an adhesive tape 1060, and FIG. 10B may be a plan view of the battery 350.

The electronic device 1000 of FIG. 10A and FIG. 10B and the elements thereof may be referred by the electronic device of FIG. 1 to FIG. 9 and the elements thereof. The same terms or the same reference numerals are used for the same or substantially the same components as those described above, and redundant descriptions are omitted.

According to an embodiment, the adhesive tape 1060 may be disposed to surround at least a part of the battery 350. For example, referring to FIG. 9, remaining parts 1062 of the adhesive tape 1060 may be disposed to surround at least a part of at least one of the one end or the other end of the battery 350. The remaining parts 1062 of the adhesive tape 1060 may face a side surface of the one end or the other end of the battery 350 and/or an upper surface of the battery 350.

According to an embodiment, in case that at least a part of the remaining parts 1062 of the adhesive tape 1060 includes the non-adhesive layer (960C of FIG. 9), the surface opposite to the non-adhesive layer may face at least a part of a surface opposite to one surface of the battery (or an upper surface of the battery) facing a part 1061 of the adhesive tape 1060. However, it is not limited thereto.

As described above, an electronic device according to an embodiment may include a support member, a battery disposed on the support member, and an adhesive tape having a part disposed to traverse an area between the battery and the support member and a remaining part exposed to the outside of the area between the battery and the support member on at least one of one end or the other end of the battery, in a state in which the battery is disposed, wherein the part of the adhesive tape includes a first area disposed in the direction toward the other end from the one end of the battery and a second area disposed in the direction toward the other end from the one end of the battery and spaced apart from the first area to provide at least one gap extending through at least one surface of the adhesive tape facing the battery, and the remaining part of the adhesive tape may include a non-adhesive layer on at least one surface thereof.

According to an embodiment, the adhesive tape may include at least one among a stretchable material or an elastic material.

According to an embodiment, at least a part of the battery may include a first section and a second section closer to the one end or the other end of the battery than the first section, wherein the width of at least one gap in a direction toward the second area from the first area in the first section may be larger than that in the second section.

According to an embodiment, the first area has a first width in a direction toward the second area from the first area and the second area has a second width in the direction toward the second area from the first area, wherein the first width may be the same as the second width.

According to an embodiment, the part of the adhesive tape includes a first section and a second section closer to the one end or the other end of the battery than the first section, wherein the width of the part of the adhesive tape in the direction toward the second area from the first area in the first section may be larger than that in the second section.

According to an embodiment, the adhesive tape is disposed such that the lengthwise direction thereof extends toward the other end from the one end of the battery, wherein, in the second section, the first area is disposed to have a first internal angle with respect to the lengthwise direction and the second area is disposed to have a second internal angle with respect to the lengthwise direction, and wherein the first internal angle and the second internal angle are acute angles.

According to an embodiment, the first area of the first section is disposed to have a third internal angle with respect to the first area of the second section, and the second area of the first section is disposed to have a fourth internal angle with respect to the second area of the second section, wherein the third internal angle and the fourth internal angle may be an obtuse angle.

According to an embodiment, the first internal angle may be equal to the second internal angle.

According to an embodiment, at least a part of an outside of at least a part of the adhesive tape may include a curved shape.

According to an embodiment, at least a part of at least one gap may include a curved shape, and at least one width among the width of the first area in a direction toward the second area from the first area or the width of the second area in a direction toward the second area from the first area may be 20 mm or less.

According to an embodiment, the remaining part of the adhesive tape may include a first end part exposed to the outside of the area between the battery and the support member at the one end of the battery and a second end part facing the first end part and exposed to the outside of the area between the battery and the support member at the other end of the battery.

According to an embodiment, the non-adhesive layer may include at least one among a printing layer or a tape.

According to an embodiment, the remaining part of the adhesive tape may be disposed such that a surface opposite to the non-adhesive layer faces a surface opposite to one surface of the battery which faces the part of the adhesive tape.

According to an embodiment, the remaining part of the adhesive tape may be disposed to surround at least a part of at least one among the one end or the other end of the battery.

As described above, the adhesive tape according to an embodiment may include a first end part, an adhesive part extending in a first direction from the first end part, and a second end part extending from the adhesive part and facing the first end part, wherein the adhesive part includes a first area disposed in a direction toward the second end part from the first end part and a second area disposed in the direction toward the second end part from the first end part and spaced apart from the first area to provide at least one gap extending through at least one surface of the adhesive part.

According to an embodiment, the adhesive tape may include at least one of a stretchable material or an elastic material.

According to an embodiment, the adhesive part may include the first section and the second section closer to the first end part or the second end part than the first section, wherein the width of at least one gap in the direction toward the second area from the first area in the first section is larger than that in the second section.

According to an embodiment, the first area has a first width in the direction toward the second area from the first area and the second area has a second width in the direction toward the second area from the first area, wherein the first width may be the same as the second width.

According to an embodiment, the adhesive part may include the first section and the second section closer to the first end part or the second end part than the first section, wherein the width of the adhesive part in the direction toward the second area from the first area in the first section is larger than that in the second section.

According to an embodiment, a lengthwise direction of the adhesive part corresponds to a direction extending from the first end part toward the second end part, wherein, in the second section, the first area is disposed to have a first internal angle with respect to the lengthwise direction and the second area is disposed to have a second internal angle with respect to the lengthwise direction, and wherein the first internal angle and the second internal angle are acute angles.

What is claimed is:

1. An electronic device comprising:
a support member;
a battery disposed on the support member; and
an adhesive tape comprising:
    a first part disposed to traverse an area between the battery and the support member, and
    a second part exposed to an outside of the area between the battery and the support member on one end and the other end of the battery,
wherein the first part of the adhesive tape comprises:
    a first area disposed in a direction from the one end of the battery to the other end of the battery, and
    a second area disposed in the direction from the one end of the battery to the other end of the battery, the second area being spaced apart from the first area to provide at least one gap extending through at least one surface of the first part of the adhesive tape facing the battery, and
wherein the second part of the adhesive tape comprises a non-adhesive layer on at least one surface of the second part of the adhesive tape, wherein the adhesive tape comprises a first section, a second section closer to the one end of the battery than the first section, and a third section closer to the other end of the battery than the first section, and
wherein a width of the first section is larger than a width of the second section and a width of the third section.

2. The electronic device of claim 1, wherein the adhesive tape further comprises at least one of a stretchable material or an elastic material.

3. The electronic device of claim 1, wherein a first width of the at least one gap in a direction from the first area to the second area in the first section is larger than a second width of the at least one gap in the second section.

4. The electronic device of claim 1, wherein:
the first area has a first width in the direction from the first area to the second area, and the second area has a second width in the direction from the first area to the second area, and
the first width and the second width are same.

5. The electronic device of claim 1, wherein:
the adhesive tape is extended in a lengthwise direction from the one end of the battery to the other end of the battery,
in the second section, the first area has a first internal angle with respect to the lengthwise direction and the second area has a second internal angle with respect to the lengthwise direction, and
the first internal angle and the second internal angle are acute angles.

6. The electronic device of claim 5, wherein:
the first area of the first section has a third internal angle with respect to the first area of the second section, and the second area of the first section has a fourth internal angle with respect to the second area of the second section, and
the third internal angle and the fourth internal angle are an obtuse angle.

7. The electronic device of claim 5, wherein the first internal angle is equal to the second internal angle.

8. The electronic device of claim 1, wherein at least a part of the adhesive tape comprises a curved shape.

9. The electronic device of claim 1, wherein:
at least a part of the at least one gap comprises a curved shape, and
at least one width of the width of the first area in the direction from the first area to the second area or the width of the second area in the direction from the first area to the second area is 20 mm or less.

10. The electronic device of claim 1, wherein the second part of the adhesive tape further comprises:
a first end part exposed to the outside of the area between the battery and the support member on the one end of the battery, and
a second end part and exposed to the outside of the area between the battery and the support member on the other end of the battery.

11. The electronic device of claim 1, wherein the non-adhesive layer comprises at least one of a printing layer or a tape.

12. The electronic device of claim 11, wherein the second part of the adhesive tape is disposed such that a surface opposite to the non-adhesive layer faces a surface opposite to one surface of the battery which faces the first part of the adhesive tape.

13. The electronic device of claim 1, wherein the second part of the adhesive tape is disposed to surround at least a part of at least one among the one end of the battery or the other end of the battery.

14. An adhesive tape comprising:

a first end part, an adhesive part extending in a first direction from the first end part, and a second end part extending from the adhesive part and opposite to the first end part, wherein the adhesive part comprises:

a first area disposed in a direction from the first end part to the second end part, and a second area disposed in the direction from the first end part to the second end part and wherein the second area is spaced apart from the first area to provide at least one gap extending through at least one surface of the adhesive part, wherein the adhesive tape comprises a first section, a second section closer to the first end part than the first section, and a third section closer to the second end part than the first section, wherein a width of the first section is larger than a width of the second section and a width of the third section, and wherein the adhesive part is positioned in an area between a battery and a support member, and wherein the first end part is exposed to an outside of the area at one end of the battery, and the second end part is exposed to the outside of the area at the other end of the battery.

15. The adhesive tape of claim 14, wherein the adhesive tape further comprises at least one of a stretchable material or an elastic material.

16. The adhesive tape of claim 14, wherein a width of the at least one gap in the direction from the first area to the second area in the first section is larger than another width of the at least one gap in the second section.

17. The adhesive tape of claim 14, wherein:

the first area has a first width in the direction from the first area to the second area, and the second area has a second width in the direction from the first area to the second area, and the first width is the same as the second width.

18. The adhesive tape of claim 14, wherein a lengthwise direction of the adhesive part corresponds to a direction from the first end part to the second end part, wherein:

in the second section, the first area has a first internal angle with respect to the lengthwise direction and the second area has a second internal angle with respect to the lengthwise direction, and the first internal angle and the second internal angle are acute angles.

19. An electronic device comprising:

a support member;

a battery provided on the support member; and an adhesive tape having a first part provided in an area between the battery and the support member in a lengthwise direction, and wherein the first part of the adhesive tape comprises:

a first area provided in a direction from an one end of the battery to the other end of the battery, and a second area provided in the direction from the one end of the battery to the other end of the battery, and wherein the first area and the second area are provided to form a non-rectangular shaped gap, wherein the adhesive tape comprises a first section, a second section closer to the one end than the first section, and a third section closer to the other end than the first section, wherein a width of the first section is larger than a width of the second section and a width of the third section, and wherein the adhesive tape further has a second part exposed to an outside of the area at one end of the battery, and a third part exposed to the outside of the area at the other end of the battery.

20. The electronic device of claim 19, wherein the non-rectangular shaped gap is one of a diamond shaped gap, a hexagon shaped gap, a honeycomb shaped gap, a blunt shaped gap, a sagittate shaped gap, or a hastate shaped gap.

\* \* \* \* \*